United States Patent
Zhao et al.

(10) Patent No.: US 11,584,842 B2
(45) Date of Patent: Feb. 21, 2023

(54) CELLULOSE FIBER-CONTAINING RESIN COMPOSITION, SHEET, AND MOLDED BODY

(71) Applicant: OJI HOLDINGS CORPORATION, Tokyo (JP)

(72) Inventors: Mengchen Zhao, Tokyo (JP); Yuichi Noguchi, Tokyo (JP); Yusuke Todoroki, Tokyo (JP); Ikue Sugiyama, Tokyo (JP); Tomoki Watanabe, Tokushima (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 79 days.

(21) Appl. No.: 16/764,674

(22) PCT Filed: Nov. 16, 2018

(86) PCT No.: PCT/JP2018/042508
§ 371 (c)(1),
(2) Date: May 15, 2020

(87) PCT Pub. No.: WO2019/098331
PCT Pub. Date: May 23, 2019

(65) Prior Publication Data
US 2020/0399443 A1 Dec. 24, 2020

(30) Foreign Application Priority Data
Nov. 17, 2017 (JP) .............................. JP2017-221433

(51) Int. Cl.
*C08L 1/02* (2006.01)
*C08L 27/06* (2006.01)
(Continued)

(52) U.S. Cl.
CPC ................ *C08L 1/02* (2013.01); *C08L 27/06* (2013.01); *C08L 27/16* (2013.01); *C08L 29/04* (2013.01);
(Continued)

(58) Field of Classification Search
CPC .......... C08L 27/06; C08L 27/16; C08L 29/04; C08L 33/08; C08L 1/02; B82Y 30/00; C08J 5/18; C08J 2301/16
(Continued)

(56) References Cited

FOREIGN PATENT DOCUMENTS

| | | |
|---|---|---|
| CN | 106661840 A | 5/2017 |
| EP | 3 385 443 A1 | 10/2018 |

(Continued)

OTHER PUBLICATIONS

International Search Report and Written Opinion dated Dec. 18, 2018 in International Application No. PCT/JP2018/042508.
(Continued)

*Primary Examiner* — Ling Siu Choi
*Assistant Examiner* — Ronald Grinsted
(74) *Attorney, Agent, or Firm* — Sughrue Mion, PLLC

(57) ABSTRACT

It is an object of the present invention to provide a resin composite comprising ultrafine cellulose fibers, in which deterioration of a resin component is suppressed. The present invention relates to a cellulose fiber-containing resin composition comprising cellulose fibers with a fiber width of 1000 nm or less having phosphoric acid groups or phosphoric acid group-derived substituents, and a resin, wherein the counterions of the phosphoric acid groups or phosphoric acid group-derived substituents are organic onium ions, and the conjugate bases of the organic onium ions have a pKb value of 1.0 or more.

8 Claims, 1 Drawing Sheet

(51) Int. Cl.
- C08L 27/16 (2006.01)
- C08L 29/04 (2006.01)
- C08L 33/08 (2006.01)
- B82Y 30/00 (2011.01)
- C08J 5/18 (2006.01)

(52) U.S. Cl.
CPC ............ *C08L 33/08* (2013.01); *B82Y 30/00* (2013.01); *C08J 5/18* (2013.01); *C08J 2301/16* (2013.01)

(58) Field of Classification Search
USPC .......................................................... 524/35
See application file for complete search history.

(56) References Cited

FOREIGN PATENT DOCUMENTS

| | | | |
|---|---|---|---|
| JP | 2010-077248 A | | 4/2010 |
| JP | 2011-047084 A | | 3/2011 |
| JP | 2011047084 A | * | 3/2011 |
| JP | 2013-203920 A | | 10/2013 |
| JP | 2015-000935 A | | 1/2015 |
| JP | 2016-017096 A | | 2/2016 |
| JP | 2016017096 A | * | 2/2016 |
| JP | 2016-156111 A | | 9/2016 |
| JP | 2016-188375 A | | 11/2016 |
| JP | 2017-025468 A | | 2/2017 |
| JP | 2017-052943 A | | 3/2017 |
| JP | 2017-066273 A | | 4/2017 |
| JP | 2017-082202 A | | 5/2017 |
| WO | 2013/073652 A1 | | 5/2013 |
| WO | 2017/094595 A1 | | 6/2017 |
| WO | 2017/170745 A1 | | 10/2017 |

OTHER PUBLICATIONS

International Preliminary Report on Patentability with the translation of Written Opinion dated May 28, 2020 in International Application No. PCT/JP2018/042508.

Extended European Search Report dated Jun. 24, 2021, from the European Patent Office in European application No. 18878570.3.

Office Action dated May 28, 2021, from the Korean Intellectual Property Office in Korean application No. 10-2020-7014192.

Office Action dated Jul. 13, 2021 from The State Intellectual Property Office of P.R. of China in Chinese Application No. 201880073918.5.

Office Action dated Jul. 12, 2022 by Japanese Patent Office in Japanese Application No. 2019-554314.

Office Action issued Dec. 13, 2022 by the Japanese Patent Office in Japanese Application No. 2019-554314.

* cited by examiner

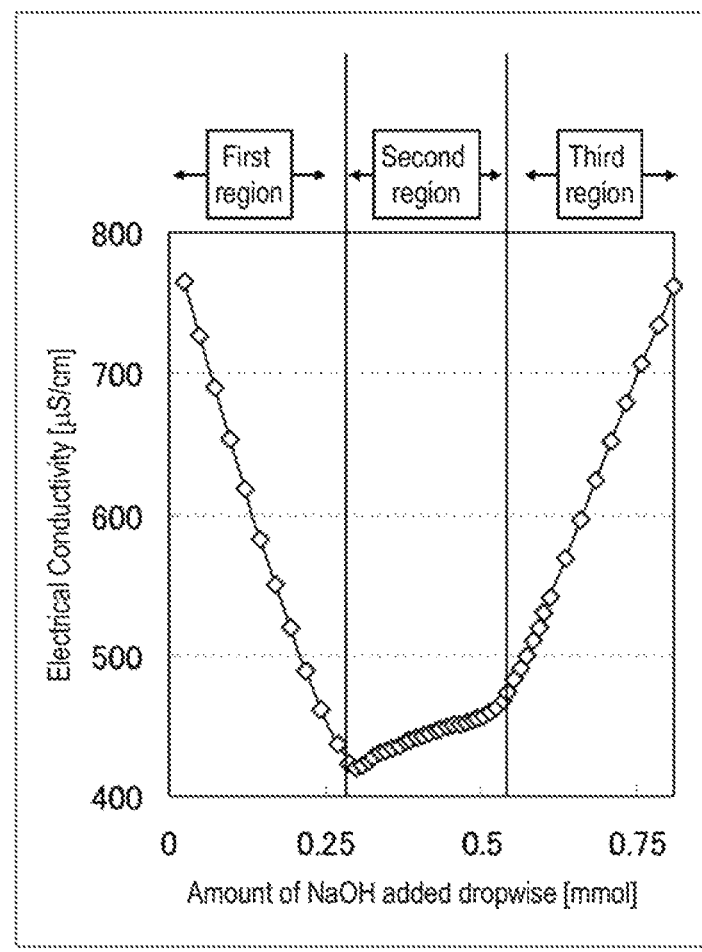

CELLULOSE FIBER-CONTAINING RESIN COMPOSITION, SHEET, AND MOLDED BODY

CROSS REFERENCE TO RELATED APPLICATIONS

This application is a National Stage of International Application No. PCT/JP2018/042508 filed Nov. 16, 2018, claiming priority based on Japanese Patent Application No. 2017-221433 filed Nov. 17, 2017.

TECHNICAL FIELD

The present invention relates to a cellulose fiber-containing resin composition, sheet, and molded body.

BACKGROUND ART

Conventionally, cellulose fibers have been broadly utilized in clothes, absorbent articles, paper products, and the like. As cellulose fibers, ultrafine cellulose fibers having a fiber diameter of 1 μm or less have been known, as well as cellulose fibers having a fiber diameter of 10 μm or more and 50 μm or less. Such ultrafine cellulose fibers have attracted attention as novel materials, and the intended use thereof has been highly diversified. For example, the development of sheets or resin composites comprising the ultrafine cellulose fibers has been promoted.

In general, ultrafine cellulose fibers are stably dispersed in an aqueous solvent. On the other hand, when a composite comprising ultrafine cellulose fibers and a resin component, etc., is produced, uniform dispersion of the ultrafine cellulose fibers and the resin component is required. Hence, in order to enhance the affinity between the ultrafine cellulose fibers and the resin component, a method of adding a surfactant such as an organic alkali to a composition comprising the ultrafine cellulose fibers and the resin component has been studied. For example, Patent Documents 1 to 4 disclose a composite comprising carboxyl group-containing ultrafine cellulose fibers, to which organic alkali binds, and a specific resin component.

Moreover, Patent Document 5 discloses a method for producing a re-dispersed slurry of the ultrafine cellulose fibers, comprising a first step of adding a compound comprising at least one type selected from an alkali-soluble metal and a polyvalent metal ion to an ultrafine cellulose fiber slurry, so as to obtain an ultrafine cellulose fiber concentrate, and a second step of adding at least one type selected from tetraalkylonium hydroxide and alkylamine to the ultrafine cellulose fiber concentrate. Patent Document 5 does not provide a specific example of mixing the obtained ultrafine cellulose fibers with a resin component, and also, the pKb of the conjugate bases of tetraalkylonium hydroxide is less than 1.0.

PRIOR ART DOCUMENTS

Patent Documents

Patent Document 1: Japanese Patent Publication No. 2016-188375 A
Patent Document 2: Japanese Patent Publication No. 2010-77248 A
Patent Document 3: Japanese Patent Publication No. 2017-82202 A
Patent Document 4: Japanese Patent Publication No. 2016-156111 A
Patent Document 5: Japanese Patent Publication No. 2017-52943 A

SUMMARY OF INVENTION

Object to be Solved by the Invention

The present inventors have conducted studies regarding a resin composite comprising ultrafine cellulose fibers. During the studies, the inventors have discovered that there is a case where a resin component may be deteriorated, when a surfactant such as organic alkali is added to a resin composition comprising ultrafine cellulose fibers and the resin component.

Hence, it is an object of the present invention to provide a resin composite comprising ultrafine cellulose fibers, in which deterioration of a resin component is suppressed.

Means for Solving the Object

As a result of intensive studies directed towards achieving the aforementioned object, the present inventors have found that, in a resin composition comprising ultrafine cellulose fibers and a resin, organic onium ions satisfying predetermined conditions are selected as counterions of the phosphoric acid groups or phosphoric acid group-derived substituents possessed by the ultrafine cellulose fibers, so that deterioration of the resin component can be suppressed in the resin composition.

Specifically, the present invention has following configurations.

[1] A cellulose fiber-containing resin composition comprising cellulose fibers with a fiber width of 1000 nm or less having phosphoric acid groups or phosphoric acid group-derived substituents, and a resin, wherein
the counterions of the phosphoric acid groups or phosphoric acid group-derived substituents are organic onium ions, and
the conjugate bases of the organic onium ions have a pKb value of 1.0 or more.

[2] The cellulose fiber-containing resin composition according to [1], wherein the organic onium ions satisfy at least one condition selected from the following (a) and (b):
(a) containing a hydrocarbon group containing 5 or more carbon atoms; and
(b) having a total carbon number of 17 or more.

[3] The cellulose fiber-containing resin composition according to [1] or [2], wherein the organic onium ions are organic ammonium ions.

[4] The cellulose fiber-containing resin composition according to any one of [1] to [3], wherein the resin is at least one type selected from an acrylic resin, a polycarbonate resin, a polyester resin, a polyamide resin, a silicone resin, a fluorine resin, a chlorine resin, an epoxy resin, a melamine resin, a phenolic resin, a polyurethane resin, a diallyl phthalate resin, an alcoholic resin, a cellulose derivative, and precursors of these resins.

[5] The cellulose fiber-containing resin composition according to any one of [1] to [4], which further comprises an organic solvent.

[6] A sheet formed from the cellulose fiber-containing resin composition according to any one of [1] to [5].

[7] A molded body formed from the cellulose fiber-containing resin composition according to any one of [1] to [5] or the sheet according to [6].

Advantageous Effects of Invention

According to the present invention, deterioration of a resin component can be suppressed in a resin composition comprising ultrafine cellulose fibers and a resin.

BRIEF DESCRIPTION OF DRAWINGS

FIG. 1 is a graph showing the relationship between the amount of NaOH added dropwise to a fiber raw material having phosphoric acid groups and electrical conductivity.

EMBODIMENTS OF CARRYING OUT THE INVENTION

Hereinafter, the present invention will be described in detail. The description for components described below will be based on representative embodiments or specific examples; however, the present invention will not be limited to such embodiments.
(Cellulose Fiber-Containing Resin Composition)

The present invention relates to a cellulose fiber-containing resin composition comprising cellulose fibers with a fiber width of 1000 nm or less having phosphoric acid groups or phosphoric acid group-derived substituents and a resin. Herein, the cellulose fiber-containing resin composition comprises organic onium ions as counterions of the phosphoric acid groups or phosphoric acid group-derived substituents, and the pKb of the conjugate bases of the organic onium ions is 1.0 or more.

Since the cellulose fiber-containing resin composition of the present invention has the above-described configuration, deterioration of the resin component is suppressed. Specifically, when a sheet (A) formed from the cellulose fiber-containing resin composition of the present invention, and a sheet (B) having the same basis weight as the sheet (A) that is formed from only the resin comprised in the cellulose fiber-containing resin composition, are subjected to the measurement of an infrared absorption spectrum, the value calculated according to the following equation (J value) becomes large. Specifically, the J value is preferably 0.80 or more, more preferably 0.85 or more, further preferably 0.90 or more, still further preferably 0.95 or more, and particularly preferably 0.99 or more. Besides, the upper limit value of the J value is not particularly limited, and it can be set to be, for example, 1.50.

$J$ value$=I_1/I_0$, wherein $I_1$ value=(absorption peak intensity of sheet (A) at 1650 cm$^{-1}$)/(absorption peak intensity of sheet (A) at 1570 cm$^{-1}$), and $I_0$ value=(absorption peak intensity of sheet (B) at 1650 cm)/(absorption peak intensity of sheet (B) at 1570 cm$^{-1}$).

It is to be noted that the measurement of an infrared absorption spectrum is carried out by applying FT-IR.

The present inventors have found that the J value fluctuates depending on the rate of progression of the deesterification of a resin component. That is to say, the inventors have discovered that deesterification of a resin component progresses when the J value is small, and that deesterification of a resin component is suppressed when the J value is large. In the present invention, a sheet formed from the cellulose fiber-containing resin composition can be evaluated that deesterification of the resin (the hydrolysis of the resin) does not progress therein, based on a relatively large J value. That is, it can be said that deterioration of the resin is suppressed.

Besides, in the case of using a resin in which deesterification does not occur, deterioration of a sheet that is formed from the cellulose fiber-containing resin composition can be evaluated based on transparency or the presence or absence of coloration. For example, when a fluorine resin or a chlorine resin is used as a resin, the total light transmittance of a sheet formed from the cellulose fiber-containing resin composition is preferably 70% or more, more preferably 80% or more, and further preferably 85% or more. It is to be noted that the total light transmittance of a sheet is a value measured in accordance with JIS K 7361, using, for example, a hazemeter (manufactured by MURAKAMI COLOR RESEARCH LABORATORY Co., Ltd.: HM-150). In addition, when a fluorine resin or a chlorine resin is used as a resin, the yellowness (YI) of a sheet formed from the cellulose fiber-containing resin composition is preferably 40 or less, more preferably 20 or less, and further preferably 10 or less. The lower limit value of the yellowness (YI) is not particularly limited, and for example, it is preferably set to be 0.1. It is to be noted that the yellowness (YI) of a sheet is a value measured in accordance with JIS K 7373, using, for example, Colour Cute i (manufactured by Suga Test Instruments Co., Ltd.).

The shape of the cellulose fiber-containing resin composition of the present invention is not particularly limited, and examples of the shape of the present cellulose fiber-containing resin composition may include a liquid such as a slurry, a solid such as a particulate, a pellet, and a gelatinous product.
(Ultrafine Cellulose Fibers)

The cellulose fiber-containing resin composition of the present invention comprises cellulose fibers with a fiber width of 1000 nm or less having phosphoric acid groups or phosphoric acid group-derived substituents. In the present description, cellulose fibers having a fiber width of 1000 nm or less is also referred to as "ultrafine cellulose fibers." It is to be noted that the fiber width of cellulose fibers can be measured, for example, by electron microscopic observation.

The average fiber width of the cellulose fibers is, for example, 1000 nm or less. For example, the average fiber width is preferably 2 nm or more and 1000 nm or less, more preferably 2 nm or more and 100 nm or less, further preferably 2 nm or more and 50 nm or less, and particularly preferably 2 nm or more and 10 nm or less. When the average fiber width of the cellulose fibers is set to be 2 nm or more, dissolution of the cellulose fibers as cellulose molecules in water is suppressed, and the effects of the cellulose fibers, such as the improvement of strength, rigidity, and dimensional stability, can be easily expressed. It is to be noted that the cellulose fibers are, for example, monofibrous cellulose.

The average fiber width of cellulose fibers is measured as follows, for example, using an electron microscope. First, an aqueous suspension of cellulose fibers having a concentration of 0.05% by mass or more and 0.1% by mass or less is prepared, and this suspension is casted onto a hydrophilized carbon film-coated grid as a sample for TEM observation. If the sample contains wide fibers, SEM images of the surface of the suspension casted onto glass may be observed. Subsequently, the sample is observed using electron microscope images taken at a magnification of 1000×, 5000×, 10000×, or 50000×, depending on the widths of fibers used as observation targets. However, the sample, the observation conditions, and the magnification are adjusted so as to satisfy the following conditions:

(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. Three or more sets of observation images of surface portions, which are at least not overlapped, are obtained. Thereafter, the widths of the fibers intersecting the straight line X and the straight line Y are read in each image. Thereby, at least 120 fiber widths (20 fibers×2×3=120) are thus read. The average value of the read fiber widths is defined to be the average fiber width of cellulose fibers.

The fiber length of the cellulose fibers is not particularly limited, and for example, it is preferably 0.1 μm or more and 1000 μm or less, more preferably 0.1 μm or more and 800 μm or less, and further preferably 0.1 μm or more and 600 μm or less. By setting the fiber length within the above-described range, destruction of the crystalline region of the cellulose fibers can be suppressed. In addition, the viscosity of a slurry of the cellulose fibers can also be set within an appropriate range. It is to be noted that the fiber length of the cellulose fibers can be obtained by an image analysis using TEM, SEM or AFM.

The cellulose fibers preferably have a type I crystal structure. Herein, the fact that the cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=140 or more and 17° or less, and near 2θ=22° or more and 23° or less.

The percentage of the type I crystal structure occupied in the ultrafine cellulose fibers is, for example, preferably 30% or more, more preferably 40% or more, and further preferably 50% or more. Thereby, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The aspect ratio (fiber length/fiber width) of the cellulose fibers is not particularly limited, and for example, it is preferably 20 or more and 10000 or less, and more preferably 50 or more and 1000 or less. By setting the aspect ratio at the above-described lower limit value or more, a sheet comprising ultrafine cellulose fibers is easily formed. Moreover, sufficient thickening properties are easily obtained upon production of a dispersed form in a solvent. By setting the aspect ratio at the above-described upper limit or less, when the cellulose fibers are treated, for example, as an aqueous dispersed solution, operations such as dilution are preferably easily handled.

The cellulose fibers in the present embodiment have, for example, both a crystalline region and an amorphous region. In particular, ultrafine cellulose fibers, which have both a crystalline region and an amorphous region and also have a high aspect ratio, are realized by the after-mentioned method for producing ultrafine cellulose fibers.

The cellulose fibers have phosphoric acid groups or phosphoric acid group-derived substituents (which are also simply referred to as "phosphoric acid groups").

The phosphoric acid group is a divalent functional group corresponding to, for example, a phosphoric acid from which a hydroxyl group is removed. Specifically, it is a group represented by —$PO_3H_2$. The phosphoric acid group-derived substituents include substituents, such as salts of phosphoric acid groups and phosphoric acid ester groups. Besides, the phosphoric acid group-derived substituents may be comprised as condensed phosphoric acid groups (for example, pyrophosphoric acid groups) in the cellulose fibers.

The phosphoric acid group or the phosphoric acid group-derived substituent may be a substituent represented by, for example, the following Formula (1):

[Formula 1]

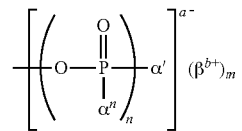

(1)

In the above Formula (1), a, b, and n each represent a natural number (provided that a=b×m); an "a" number of $\alpha^1$, $\alpha^2$, ..., $\alpha^n$ and $\alpha'$ is O—, and the rest is either R or OR. All of $\alpha^n$ and $\alpha'$ may also be O—. Reach represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an unsaturated cyclic hydrocarbon group, an aromatic group, or a derivative group thereof.

Examples of the saturated straight chain hydrocarbon group may include a methyl group, an ethyl group, an n-propyl group, and an n-butyl group, but are not particularly limited thereto. Examples of the saturated branched chain hydrocarbon group may include an i-propyl group and a t-butyl group, but are not particularly limited thereto. Examples of the saturated cyclic hydrocarbon group may include a cyclopentyl group and a cyclohexyl group, but are not particularly limited thereto. Examples of the unsaturated straight chain hydrocarbon group may include a vinyl group and an allyl group, but are not particularly limited thereto. Examples of the unsaturated branched chain hydrocarbon group may include an i-propenyl group and a 3-butenyl group, but are not particularly limited thereto. Examples of the unsaturated cyclic hydrocarbon group may include a cyclopentenyl group and a cyclohexenyl group, but are not particularly limited thereto. Examples of the aromatic group may include a phenyl group and a naphthyl group, but are not particularly limited thereto.

Moreover, examples of the derivative group of the R may include functional groups such as a carboxyl group, a hydroxyl group or an amino group, in which at least one type selected from the functional groups is added to or substituted with the main chain or side chain of the above-described various types of hydrocarbon groups, but are not particularly limited thereto. Furthermore, the number of carbon atoms constituting the main chain of the above-described R is not particularly limited, and it is preferably 20 or less, and more preferably 10 or less. By setting the number of carbon atoms constituting the main chain of the R within the above-described range, the molecular weight of phosphoric acid groups can be adjusted in a suitable range, permeation thereof into a fiber raw material can be facilitated, and the yield of the ultrafine cellulose fibers can also be enhanced.

$\beta^{b+}$ is a mono- or more-valent cation consisting of an organic or inorganic matter. Examples of the mono- or more-valent cation consisting of an organic matter may include an aliphatic ammonium and an aromatic ammonium, and examples of the mono- or more-valent cation consisting of an inorganic matter may include alkali metal ions such as sodium, potassium or lithium ions, divalent metal cations such as calcium or magnesium ions, and hydrogen ions, but are not particularly limited thereto. These can be applied alone as a single type or in combination of two or more types. As such mono- or more-valent cations consisting of an organic or inorganic matter, sodium or potassium ions, which hardly cause the yellowing of a fiber raw material containing § upon heating and are industrially easily applicable, are preferable, but are not particularly limited thereto.

The amount of phosphoric acid groups introduced into the cellulose fibers is, for example, per 1 g (mass) of the cellulose fibers, preferably 0.10 mmol/g or more, more preferably 0.20 mmol/g or more, further preferably 0.50 mmol/g or more, and particularly preferably 1.00 mmol/g or more. On the other hand, the amount of phosphoric acid groups introduced into the cellulose fibers is, for example, per 1 g (mass) of the ultrafine cellulose fibers, preferably 5.20 mmol/g or less, more preferably 3.65 mmol/g or less, and further preferably 3.00 mmol/g or less. By setting the amount of phosphoric acid groups introduced within the above-described range, it can become easy to perform fibrillation on the fiber raw material, and the stability of the cellulose fibers can be enhanced. In addition, by setting the amount of phosphoric acid groups introduced within the above-described range, favorable properties can be exhibited in a sheet comprising the cellulose fibers, etc.

Herein, the denominator in the unit mmol/g indicates the mass of cellulose fibers, when the counterions of phosphoric acid groups are hydrogen ions ($H^+$).

The amount of phosphoric acid groups introduced into the cellulose fibers may be measured, for example, by a conductometric titration method. In the measurement according to the conductometric titration method, while an alkali such as a sodium hydroxide aqueous solution is added to a slurry containing the obtained cellulose fibers, a change in the electrical conductivity is obtained, so that the amount of phosphoric acid groups introduced is measured.

FIG. 1 is a graph showing the relationship between the amount of NaOH added dropwise to cellulose fibers having phosphoric acid groups and electrical conductivity. The amount of the phosphoric acid groups introduced into the cellulose fibers is measured, for example, as follows. First, a slurry containing cellulose fibers is treated with a strongly acidic ion exchange resin. Before the treatment with the strongly acidic ion exchange resin, the same defibration treatment as the after-mentioned defibration treatment may be performed on the cellulose fibers, as necessary. Subsequently, while adding a sodium hydroxide aqueous solution, a change in the electrical conductivity is observed, and a titration curve as shown in FIG. 1 is obtained. As shown in FIG. 1, first, the electrical conductivity is rapidly reduced (hereinafter, this region is referred to as a "first region"). Then, the conductivity starts rising slightly (hereinafter, this region is referred to as a "second region"). Then, the increment of the conductivity is further increased (hereinafter, this region is referred to as a "third region"). The boundary point between the second region and the third region is defined as a point at which a change amount in the two differential values of conductivity, namely, an increase in the conductivity (inclination) becomes maximum. Thus, three regions appear in the titration curve. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Hence, the simple term "the amount of the phosphoric acid group introduced (or the amount of the phosphoric acid group)" or "the amount of the substituent introduced (or the amount of the substituent)" refers to the amount of the strongly acidic group. Therefore, the value obtained by dividing the amount (mmol) of the alkali required for the first region in the titration curve as obtained above by the solid content (g) in the slurry as a titration target becomes the amount (mmol/g) of the phosphoric acid groups introduced.

The content of cellulose fibers in the cellulose fiber-containing resin composition is preferably 0.1% by mass or more, more preferably 1% by mass or more, and further preferably 2% by mass or more, with respect to the total mass of a solid content in the cellulose fiber-containing resin composition. On the other hand, the content of the cellulose fibers is preferably 99% by mass or less, more preferably 90% by mass or less, and further preferably 80% by mass or less, with respect to the total mass of a solid content in the cellulose fiber-containing resin composition.

(Step of Producing Ultrafine Cellulose Fibers)
<Fiber Raw Material>

Ultrafine cellulose fibers are produced from a fiber raw material comprising cellulose. Such a fiber raw material comprising cellulose is not particularly limited, and pulp is preferably used from the viewpoint of availability and inexpensiveness. Examples of the pulp may include wood pulp, non-wood pulp, and deinked pulp. Examples of the wood pulp may include, but are not particularly limited to, chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP); semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp may include, but not particularly limited to, cotton pulps such as cotton linter and cotton lint; and non-wood type pulps such as hemp, wheat straw, and bagasse. An example of a deinked pulp may be, but is not particularly limited to, a deinked pulp using waste paper as a raw material. The pulp of the present embodiment may be used alone as a single type, or in combination of two or more types.

Among the above-listed pulps, for example, wood pulp and deinked pulp are preferable from the viewpoint of easy availability. Moreover, among wood pulps, for example, chemical pulp is more preferable, and kraft pulp and sulfite pulp are further preferable, from the viewpoint that it has a higher cellulose content ratio so as to enhance the yield of ultrafine cellulose fibers upon the defibration treatment, and that decomposition of cellulose in the pulp is mild, so that ultrafine cellulose fibers having a long fiber length with a high aspect ratio can be obtained.

As a fiber raw material comprising cellulose, for example, cellulose comprised in Ascidiacea, or bacterial cellulose generated by acetic acid bacteria can also be utilized. In addition fibers formed from straight-chain nitrogen-containing polysaccharide polymers such as chitin and chitosan can also be used, instead of a fiber raw material containing cellulose.

<Phosphoric Acid Group Introduction Step>

The phosphoric acid group introduction step is a step of reacting at least one compound selected from compounds capable of introducing phosphoric acid groups (hereinafter also referred to as "Compound A") with a hydroxyl group of a fiber raw material comprising cellulose, so that the compound is allowed to act on the fiber raw material comprising cellulose. By this step, phosphoric acid group-introduced fibers can be obtained.

In the phosphoric acid group introduction step according to the present embodiment, the reaction of the fiber raw material comprising cellulose with Compound A may be carried out in the presence of at least one type selected from urea and a derivative thereof (hereinafter also referred to as "Compound B"). Otherwise, the reaction of the fiber raw material comprising cellulose with Compound A may also be carried out in the absence of Compound B.

One example of the method of allowing Compound A to act on the fiber raw material in the presence of Compound B may include a method of mixing Compound A and Compound B into the fiber raw material that is in a dry or wet state, or in a slurry state. Among the fiber raw materials in these states, because of the high uniformity of the reaction, the fiber raw material that is in a dry or wet state is preferably used, and the fiber raw material in a dry state is particularly preferably used. The shape of the fiber raw material is not particularly limited, and for example, a cotton-like or thin sheet-like fiber raw material is preferable. Compound A and Compound B may be added to the fiber raw material by the method of adding Compound A and Compound B that are dissolved in a solvent to form a solution, or are melted by being heated to a melting point or higher. Among these, because of the high uniformity of the reaction, the compounds are preferably added to the fiber raw material, in the form of a solution obtained by dissolution thereof in a solvent, or in particular, in the form of an aqueous solution. Moreover, Compound A and Compound B may be simultaneously added, or may also be added, separately. Alternatively, Compound A and Compound B may be added in the form of a mixture thereof. The method of adding Compound A and Compound B is not particularly limited, and in a case where Compound A and Compound B are in the form of a solution, the fiber raw material may be immersed in the solution for liquid absorption, and may be then removed therefrom, or the solution may also be added dropwise onto the fiber raw material. Otherwise, Compound A and Compound B in necessary amounts may be added to the fiber raw material, or Compound A and Compound B in excessive amounts may be added to the fiber raw material and then, may be squeezed or filtrated to remove redundant Compound A and Compound B.

Examples of Compound A used in the present embodiment may include phosphoric acid or a salt thereof, dehydrated condensed phosphoric acid or a salt thereof, and phosphoric anhydride (diphosphorus pentoxide), but are not particularly limited thereto. As such phosphoric acid, those having various purities can be used, and for example, 100% phosphoric acid (orthophosphoric acid) or 85% phosphoric acid can be used. Dehydrated condensed phosphoric acid is phosphoric acid that is condensed by two or more molecules according to a dehydration reaction, and examples of such dehydrated condensed phosphoric acid may include pyrophosphoric acid and polyphosphoric acid. Examples of the phosphate and salts of dehydrated condensed phosphoric acid may include lithium salts, sodium salts, potassium salts, and ammonium salts of phosphoric acid or dehydrated condensed phosphoric acid, and these salts may have various neutralization degrees. Among these, from the viewpoints of high efficiency in introduction of the phosphoric acid groups, an improving tendency of the defibration efficiency in a defibration step described below, low costs, and industrial applicability, phosphoric acid, sodium salts of phosphoric acid, potassium salts of phosphoric acid, or ammonium salts of phosphoric acid are preferable, and phosphoric acid, sodium dihydrogen phosphate, disodium hydrogen phosphate, or ammonium dihydrogen phosphate is more preferable.

The amount of Compound A added to the fiber raw material is not particularly limited, and for example, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and further preferably 2% by mass or more and 30% by mass or less. By setting the amount of phosphorus atoms added to the fiber raw material within the above-described range, the yield of the ultrafine cellulose fibers can be further improved. On the other hand, by setting the amount of phosphorus atoms added to the fiber raw material to the above-described upper limit value or less, the balance between the effect of improving the yield and costs can be kept.

Compound B used in the present embodiment is at least one type selected from urea and a derivative thereof, as described above. Examples of Compound B may include urea, biuret, 1-phenyl urea, 1-benzyl urea, 1-methyl urea, and 1-ethyl urea. From the viewpoint of the improvement of the uniformity of the reaction, Compound B is preferably used in the form of an aqueous solution. Moreover, from the viewpoint of the further improvement of the uniformity of the reaction, an aqueous solution, in which both Compound A and Compound B are dissolved, is preferably used.

The amount of Compound B added to the fiber raw material (absolute dry mass) is not particularly limited, and for example, it is preferably 1% by mass or more and 500% by mass or less, more preferably 10% by mass or more and 400% by mass or less, and further preferably 100% by mass or more and 350% by mass or less.

In the reaction of the fiber raw material comprising cellulose with Compound A, for example, amides or amines, as well as Compound B, may be comprised in the reaction system. Examples of the amides may include formamide, dimethylformamide, acetamide, and dimethylacetamide. Examples of the amines may include methylamine, ethylamine, trimethylamine, triethylamine, monoethanolamine, diethanolamine, triethanolamine, pyridine, ethylenediamine, and hexamethylenediamine. Among these, particularly, triethylamine is known to work as a favorable reaction catalyst.

In the phosphoric acid group introduction step, after Compound A, etc. is added or mixed into the fiber raw material, a heat treatment is preferable performed on the fiber raw material. For the temperature of such a heat treatment, it is preferable to select a temperature that allows an efficient introduction of phosphoric acid groups, while suppressing the thermal decomposition or hydrolysis reaction of fibers. For example, the heat treatment temperature is preferably 50° C. or higher and 300° C. or lower, more preferably 100° C. or higher and 250° C. or lower, and further preferably 130° C. or higher and 200° C. or lower. In addition, apparatuses having various heating media can be utilized in the heat treatment, and examples of such an apparatus may include a stirring dryer, a rotary dryer, a disk dryer, a roll-type heater, a plate-type heater, a fluidized bed dryer, an airborne dryer, a vacuum dryer, an infrared heating device, a far-infrared heating device, and a microwave heating device.

In the heat treatment according to the present embodiment, a method comprising adding Compound A to a thin sheet-like fiber raw material by impregnation or the like, and then heating the fiber raw material, or a method comprising heating a fiber raw material, while kneading or stirring the fiber raw material and Compound A using a kneader or the like, can be adopted. Thereby, the unevenness in the concentration of the Compound A in the fiber raw material can be suppressed, and phosphoric acid groups can be more uniformly introduced into the surface of cellulose fibers comprised in the fiber raw material, his is considered because, when water molecules move to the surface of the fiber raw material as drying advances, Compound A dissolved therein is attracted to the water molecules due to surface tension and as a result, Compound A also moves to the surface of the fiber raw material (specifically, the unevenness in the concentration of the Compound A occurs), and because such a phenomenon can be suppressed by adopting the aforementioned method.

As a heating device used for the heat treatment, for example, a device capable of always discharging moisture retained by slurry or moisture generated by the dehydration condensation (phosphoric acid esterification) reaction of Compound A with hydroxyl groups, etc. comprised in cellulose or the like in the fiber raw material, to the outside of the device system, is preferable. Such a heating device may be, for example, a ventilation-type oven. By always discharging moisture from the device system, in addition to being able to suppress a hydrolysis reaction of phosphoric acid ester bonds, which is a reverse reaction of the phosphoric acid esterification, the acid hydrolysis of sugar chains in the fibers may also be suppressed. Thus, it becomes possible to obtain ultrafine cellulose fibers with a high axial ratio.

The time for the heat treatment is preferably 1 second or more and 300 minutes or less, more preferably 1 second or more and 1000 seconds or less, and further preferably 10 seconds or more and 800 seconds or less, for example, after moisture has been substantially removed from the fiber raw material. In the present embodiment, by setting the heating temperature and the heating time within an appropriate range, the amount of phosphoric acid groups introduced can be set within a preferred range.

The phosphoric acid group introduction step may be performed at least once, but may also be repeated two or more times. By performing the phosphoric acid group introduction step two or more times, many phosphoric acid groups can be introduced into the fiber raw material. In the present embodiment, as one example of a preferred aspect, the phosphoric acid group introduction step is performed two times.

<Washing Step>

In the method for producing ultrafine cellulose fibers according to the present embodiment, a washing step may be performed on the phosphoric acid group-introduced fibers, as necessary. The washing step is carried out by washing the phosphoric acid group-introduced fibers, for example, with water or an organic solvent. In addition, the washing step may be performed after each step as described below, and the number of washing operations performed in each washing step is not particularly limited.

<Alkali Treatment Step>

When the ultrafine cellulose fibers are produced, an alkali treatment may be performed on the fiber raw material between the phosphoric acid group introduction step and a defibration treatment step as described below. The method of the alkali treatment is not particularly limited. For example, a method of immersing the phosphoric acid group-introduced fibers in an alkaline solution may be applied.

The alkali compound contained in the alkaline solution is not particularly limited, and it may be an inorganic alkaline compound or an organic alkali compound. In the present embodiment, because of high versatility, for example, sodium hydroxide or potassium hydroxide is preferably used as an alkaline compound. In addition, the solvent contained in the alkaline solution may be either water or an organic solvent. Among others, the solvent contained in the alkaline solution is preferably water, or a polar solvent including a polar organic solvent such as alcohol, and is more preferably an aqueous solvent containing at least water. As an alkaline solution, for example, a sodium hydroxide aqueous solution or a potassium hydroxide aqueous solution is preferable, because of high versatility.

The temperature of the alkali solution in the alkali treatment step is not particularly limited, and for example, it is preferably 5° C. or higher and 80° C. or lower, and more preferably 10° C. or higher and 60° C. or lower. The time for immersion of the phosphoric acid group-introduced fibers in the alkali solution in the alkali treatment step is not particularly limited, and for example, it is preferably 5 minutes or more and 30 minutes or less, and more preferably 10 minutes or more and 20 minutes or less. The amount of the alkali solution used in the alkali treatment is not particularly limited, and for example, it is preferably 100% by mass or more and 100000% by mass or less, and more preferably 1000% by mass and 10000% by mass or less, with respect to the absolute dry mass of the phosphoric acid group-introduced fibers.

In order to reduce the amount of the alkaline solution used in the alkali treatment step, the phosphoric acid group-introduced fibers may be washed with water or an organic solvent after the phosphoric acid group introduction step and before the alkali treatment step. After the alkali treatment step and before the defibration step, the alkali-treated phosphoric acid group-introduced fibers are preferably washed with water or an organic solvent, from the viewpoint of the improvement of the handling ability.

<Acid Treatment Step>

When ultrafine cellulose fibers are produced, an acid treatment may be performed on the fiber raw material between the step of introducing phosphoric acid groups into the fiber raw material and the after-mentioned defibration treatment step. For example, a phosphoric acid group introduction step, an acid treatment, an alkali treatment, and a defibration treatment may be performed in this order.

Such an acid treatment method is not particularly limited, and for example, a method of immersing the fiber raw material in an acid solution containing an acid may be applied. The concentration of the used acid solution is not particularly limited, and for example, it is preferably 10% by mass or less, and more preferably 5% by mass or less. In addition, the pH of the used acid solution is not particularly limited, and for example, it is preferably a pH value of 0 or more and 4 or less, and more preferably a pH value of 1 or more and 3 or less. Examples of the acid contained in the acid solution that can be used herein may include inorganic acid, sulfonic acid, and carboxylic acid. Examples of the inorganic acid may include sulfuric acid, nitric acid, hydrochloric acid, hydrobromic acid, hydroiodic acid, hypochlorous acid, chlorous acid, chloric acid, perchloric acid, phosphoric acid, and boric acid. Examples of the sulfonic acid may include methanesulfonic acid, ethanesulfonic acid, benzenesulfonic acid, p-toluenesulfonic acid, and trifluoromethanesulfonic acid. Examples of the carboxylic acid may include formic acid, acetic acid, citric acid, gluconic acid, lactic acid, oxalic acid, and tartaric acid. Among these acids, it is particularly preferable to use hydrochloric acid or sulfuric acid.

The temperature of the acid solution used in the acid treatment is not particularly limited, and for example, it is preferably 5° C. or higher and 100° C. or lower, and more preferably 20° C. or higher and 90° C. or lower. The time for immersion of the fiber raw material in the acid solution in the acid treatment is not particularly limited, and for example, it is preferably 5 minutes or more and 120 minutes or less, and more preferably 10 minutes or more and 60 minutes or less. The amount of the acid solution used in the acid treatment is not particularly limited, and for example, it is preferably 100% by mass or more and 100000% by mass or less, and more preferably 1000% by mass or more and 10000% by mass or less, with respect to the absolute dry mass of the fiber raw material.

<Defibration Treatment>

By performing a defibration treatment on the phosphoric acid group-introduced fibers in a defibration treatment step, ultrafine cellulose fibers are obtained. In the defibration treatment step, for example, a defibration treatment apparatus can be used. Such a defibration treatment apparatus is not particularly limited, and for example, a high-speed defibrator, a grinder (stone mill-type crusher), a high-pressure homogenizer, an ultrahigh-pressure homogenizer, a high-pressure collision-type crusher, a ball mill, a bead mill, a disc-type refiner, a conical refiner, a twin-screw kneader, an oscillation mill, a homomixer under high-speed rotation, an ultrasonic disperser, a beater or the like can be used. Among the above-described defibration treatment apparatuses, it is more preferable to use a high-speed defibrator, a high-pressure homogenizer, and an ultrahigh-pressure homogenizer, which are less affected by milling media, and are less likely to be contaminated.

In the defibration treatment step, for example, the phosphoric acid group-introduced fibers are preferably diluted with a dispersion medium to form a slurry. As a dispersion medium, water, and one type or two or more types selected from organic solvents such as polar organic solvents can be used. The polar organic solvent is not particularly limited, and for example, alcohols, polyhydric alcohols, ketones, ethers, esters, aprotic polar solvents, etc. are preferable. Examples of the alcohols may include methanol, ethanol, isopropanol, n-butanol, and isobutyl alcohol. Examples of the polyhydric alcohols may include ethylene glycol, propylene glycol, and glycerin. Examples of the ketones may include acetone and methyl ethyl ketone (MEK). Examples of the ethers may include diethyl ether, tetrahydrofuran, ethylene glycol monomethyl ether, ethylene glycol monoethyl ether, ethylene glycol mono n-butyl ether, and propylene glycol monomethyl ether. Examples of the esters may include ethyl acetate and butyl acetate. Examples of the aprotic polar solvents may include dimethyl sulfoxide (DMSO), dimethylformamide (DMF), dimethylacetamide (DMAc), and N-methyl-2-pyrrolidinone (NMP).

The solid concentration of the ultrafine cellulose fibers upon the defibration treatment can be determined, as appropriate. In addition, in a slurry obtained by dispersing the phosphoric acid group-introduced fibers in a dispersion medium, solids other than the phosphoric acid group-introduced fibers, such as hydrogen-binding urea, may be comprised.

<Aggregation Step>

In the aggregation step, the after-mentioned organic onium ions, or compounds that form organic onium ions as a result of neutralization, are added to the ultrafine cellulose fiber-containing slurry obtained in the defibration treatment step. At this time, organic onium ions are added, preferably in the form of a solution containing the organic onium ions, and more preferably in the form of an aqueous solution containing the organic onium ions.

The aqueous solution containing the organic onium ions generally contains organic onium ions and counterions (anions). Upon preparation of such an aqueous solution containing organic onium ions, if the organic onium ions and the corresponding counterions have already formed salts, they may be directly dissolved in water. In addition, there may also be a case where some organic onium ions are generated only after neutralization with acid, as in the case of dodecylamine. That is to say, organic onium ions may also be obtained by a reaction of a compound forming the organic onium ions as a result of neutralization, with acid. In this case, examples of the acid used in neutralization may include: inorganic acids such as hydrochloric acid, sulfuric acid and nitric acid; and organic acids such as lactic acid, formic acid and oxalic acid. In the aggregation step, it may be adequate if a compound forming organic onium as a result of neutralization is directly added into an ultrafine cellulose fiber-containing slurry, so that the phosphoric acid groups comprised in the ultrafine cellulose fibers may be converted as counterions to organic onium ions.

The additive amount of the organic onium ions is preferably 2% by mass or more, more preferably 10% by mass or more, further preferably 50% by mass or more, and particularly preferably 100% by mass or more, with respect to the total mass of the ultrafine cellulose fibers. On the other hand, the additive amount of the organic onium ions is preferably 1000% by mass or less with respect to the total mass of the ultrafine cellulose fibers.

Moreover, the number of moles of the organic onium ions to be added is preferably 0.2 times or more, more preferably 1.0 time or more, and further preferably 2.0 times or more the value obtained by multiplying the amount of phosphoric acid groups comprised in the ultrafine cellulose fibers (the number of moles) by the valence. On the other hand, the number of moles of the organic onium ions to be added is preferably 10 times or less the value obtained by multiplying the amount of phosphoric acid groups comprised in the ultrafine cellulose fibers (the number of moles) by the valence.

When the organic onium ions are added to the ultrafine cellulose fiber-containing slurry, followed by stirring, an aggregate is generated in the ultrafine cellulose fiber-containing slurry, his aggregate is generated as a result of aggregation of the ultrafine cellulose fibers having organic onium ions as counterions. Herein, the pKb of the conjugate bases of the organic onium ions is 1.0 or more. The ultrafine cellulose fiber-containing slurry, in which an aggregate is generated, is subjected to vacuum filtration, so as to recover an ultrafine cellulose fiber aggregate.

The obtained ultrafine cellulose fiber aggregate may be washed with ion exchange water. By repeatedly washing the ultrafine cellulose fiber aggregate with ion exchange water, redundant organic onium ions and the like comprised in the ultrafine cellulose fiber aggregate can be removed.

The ratio of the content of N atoms to the content of P atoms (N/P value) in the obtained ultrafine cellulose fiber aggregate is preferably greater than 1.2, and more preferably greater than 2.0. On the other hand, the ratio of the content of N atoms to the content of P atoms (N/P value) in the obtained ultrafine cellulose fiber aggregate is preferably 5.0 or less. Besides, the content of P atoms and the content of N atoms in the ultrafine cellulose fiber aggregate can be appropriately calculated by an elemental analysis. As such an elemental analysis, for example, a trace nitrogen analysis, a molybdenum blue method, etc. can be carried out after an appropriate pre-treatment. When a composition other than the ultrafine cellulose fiber aggregate comprises P atoms or N atoms, the composition may be separated from the ultrafine cellulose fiber aggregate according to a suitable method, and an elemental analysis may be then carried out.

The solid concentration of the obtained ultrafine cellulose fiber aggregate is preferably 50% by mass or more, more preferably 60% by mass or more, and further preferably 70% by mass or more.

<Organic Onium Ions>

The pKb of the conjugate bases of the organic onium ions may be 1.0 or more. The pKb is more preferably 1.5 or more, and further preferably 2.0 or more. The upper limit value of the pKb of the conjugate bases of the organic onium ions is not particularly limited, and for example, it is preferably 7.0. It is to be noted that organic onium ions and the conjugate bases of the organic onium ions have the following relationship:

Conjugate bases of organic onium ions+
$H_2O \Leftrightarrow$ organic onium ions+$OH^-$ Herein, the pKb of the conjugate bases of the organic onium ions can be measured by the following method. First, the conjugate bases of organic onium ions are prepared, separately, and water is then added to the conjugate bases of organic onium ions to prepare a 0.01 N aqueous solution of the conjugate bases of organic onium ions. Thereafter, the pH of the aqueous solution at 25° C. is measured, and the pKb of the conjugate bases of the organic onium ions is then calculated according the following equations (1) and (2). As the pKb value of the conjugate bases decreases, it indicates that the basicity of the conjugate base aqueous solution is strong.

$$[OH]=10^{-(14-pH)} \quad (1)$$

$$pKb=-\log_{10}([OH]^2/(0.01-[OH])) \quad (2)$$

In the above equations, [OH] indicates the concentration of hydroxide ions (mol/L) in the aqueous solution of the conjugate bases of organic onium.

The conjugate bases of organic onium that is hardly soluble in water are hardly ionized in water, and thus, they hardly release hydroxide ions. Hence, the pKb is assumed to be extremely large, and thus, in the present description, the pKb of the conjugate bases of the hardly-soluble organic onium is considered to be greater than 3.0.

Moreover, with regard to the pKb of the conjugate bases of the organic onium ions, the values described in publications can also be adopted.

The organic onium ions preferably satisfy at least one condition selected from the following (a) and (b):

(a) containing a hydrocarbon group containing 5 or more carbon atoms; and
(b) having a total carbon number of 17 or more.

That is to say, the ultrafine cellulose fibers preferably comprise at least one selected from an organic onium ion comprising a hydrocarbon group containing 5 or more carbon atoms, and an organic onium ion having a total carbon number of 17 or more, as a counterion of a phosphoric acid group or a phosphoric acid group-derived substituent.

The hydrocarbon group containing 5 or more carbon atoms is preferably an alkyl group containing 5 or more carbon atoms or an alkylene group containing 5 or more carbon atoms, more preferably an alkyl group containing 7 or more carbon atoms or an alkylene group containing 7 or more carbon atoms, and further preferably an alkyl group containing 10 or more carbon atoms or an alkylene group containing 10 or more carbon atoms. Among others, the organic onium ion preferably comprises an alkyl group containing 5 or more carbon atoms alkyl group, and more preferably comprises an alkyl group containing 5 or more carbon atoms and also has a total carbon number of 17 or more.

The organic onium ion comprising a hydrocarbon group containing 5 or more carbon atoms, and the organic onium ion having a total carbon number of 17 or more, are preferably organic onium ions represented by the following formula (A):

[Formula 2]

Formula (A)

In the above formula (A), M represents a nitrogen atom or a phosphorus atom, and $R_1$ to $R_4$ each independently represent a hydrogen atom or an organic group. However, at least one of $R_1$ to $R_4$ represents an organic group containing 5 or more carbon atoms, or the total number of carbon atoms contained in $R_1$ to $R_4$ is 17 or more.

Among others, M is preferably a nitrogen atom. Specifically, the organic onium ion is an organic ammonium ion. Moreover, preferably, at least one of $R_1$ to $R_4$ is an alkyl group containing 5 or more carbon atoms, and the total number of carbon atoms contained in $R_1$ to $R_4$ is 17 or more. The alkyl group containing 5 or more carbon atoms may optionally have a substituent.

Examples of such an organic onium ion may include lauryltrimethyl ammonium, cetyltrimethyl ammonium, stearyltrimethyl ammonium, octyldimethylethyl ammonium, lauryldimethylethyl ammonium, didecyldimethyl ammonium, lauryldimethylbenzyl ammonium, tributylbenzyl ammonium, methyltri-n-ocyl ammonium hexyl ammonium, n-octyl ammonium, dodecyl ammonium, tetradecyl ammonium, hexadecyl ammonium, stearyl ammonium, N,N-dimethyldodecyl ammonium, N,N-dimethyltetradecyl ammonium, N,N-dimethylhexadecyl ammonium, N,N-dimethyl-n-octadecyl ammonium, dihexyl ammonium, di(2-ethylhexyl) ammonium, di-n-octyl ammonium, didecyl ammonium, didodecyl ammonium, didecylmethyl ammonium, N,N-didodecylmethyl ammonium, N,N-didecylmethyl ammonium, polyoxyethylene dodecyl ammonium, alkyldimethylbenzyl ammonium, di-n-alkyldimethyl ammonium, behenyltrimethyl ammonium, tetraphenyl phosphonium, tetraoctyl phosphonium, acetonyltriphenyl phosphonium, allyltriphenyl phosphonium, amyltriphenyl phosphonium, benzyltriphenyl phosphonium, ethyltriphenyl phosphonium, diphenylpropyl phosphonium, triphenyl phosphonium, tricyclohexyl phosphonium, and tri-n-octyl phosphonium.

Besides, as shown in the formula (A), the center element of the organic onium ion binds to a total of 4 groups or hydrogen atoms. When the aforementioned organic onium ion, the center element of which binds to less than 4 groups, hydrogen atom(s) bind to the rest(s), so as to form an organic onium ion(s). For example, in the case of N,N-didodecylmethyl ammonium, it can be determined from the name thereof that two dodecyl groups and one methyl group bind thereto. In this case, a hydrogen atom binds to the remaining one to form an organic onium ion.

The molecular weight of the organic onium ion is preferably 2000 or less, and more preferably 1800 or less. By setting the molecular weight of the organic onium ion within the above-described range, the handling ability of the ultrafine cellulose fibers can be enhanced. In addition, as a whole, a decrease in the content rate of cellulose can be suppressed.

The content of the organic onium ions in the ultrafine cellulose fibers is preferably an amount that is equimolar to or is 2 times the molar amount of phosphoric acid groups contained in the ultrafine cellulose fibers, but is not particularly limited thereto. The content of the organic onium ions can be measured by tracking atoms typically contained in the organic onium ions. Specifically, when the organic onium ions are ammonium ions, the amount of nitrogen atoms is measured, and when the organic onium ions are phosphonium ions, the amount of phosphorus atoms is measured. When the ultrafine cellulose fibers comprise nitrogen atoms or phosphorus atoms, as well as the organic onium ions, a method of extracting only the organic onium ions, for example, an extraction operation using acid, etc. may be carried out, and thereafter, the amount of atoms of interest may be measured.

(Resin)

The cellulose fiber-containing resin composition of the present invention comprises a resin. The type of such a resin is not particularly limited, and examples of the resin may include a thermoplastic resin and a thermosetting resin.

Among others, the resin is preferably at least one type selected from an acrylic resin, a polycarbonate resin, a polyester resin, a polyamide resin, a silicone resin, a fluorine resin, a chlorine resin, an epoxy resin, a melamine resin, a phenolic resin, a polyurethane resin, a diallyl phthalate resin, an alcoholic resin, a cellulose derivative and precursors of these resins; more preferably at least one type selected from an acrylic resin, a polycarbonate resin, a polyester resin, a polyamide resin, a silicone resin, an epoxy resin, a melamine resin, a phenolic resin, a polyurethane resin, a diallyl phthalate resin, an alcoholic resin, a cellulose derivative and precursors of these resins; and further preferably at least one type selected from an acrylic resin and a polyviniyl alcohol resin.

Besides, examples of the cellulose derivative may include carboxymethyl cellulose, methyl cellulose, and hydroxyethyl cellulose.

The ultrafine cellulose fiber-containing resin composition of the present invention may comprise a resin precursor. The type of such a resin precursor is not particularly limited, and examples may include a thermoplastic resin precursor and a thermosetting resin precursor. The thermoplastic resin precursor means a monomer or an oligomer having a relatively low molecular weight, which is used to produce a thermoplastic resin. The thermosetting resin precursor means a monomer or an oligomer having a relatively low molecular weight, which causes a polymerization reaction or a cross-linking reaction by the action of light, heat or a hardening agent, and as a result, may form a thermosetting resin.

The cellulose fiber-containing resin composition of the present invention may further comprise a water-soluble polymer as a resin that is different from the aforementioned resin type. Examples of the water-soluble polymer may include thickening polysaccharides, such as xanthan gum, guar gum, tamarind gum, carrageenan, locust bean gum, quince seed, alginic acid, pullulan, carrageenan, and pectin; starches, such as cationized starch, raw starch, oxidized starch, etherified starch, esterified starch, and amylose; glycerins, such as glycerin, diglycerin, and polyglycerin; and hyaluronic acid and a metal salt of hyaluronic acid.

The content of the resin in the cellulose fiber-containing resin composition is preferably 1% by mass or more, more preferably 10% by mass or more, and further preferably 20% by mass or more, with respect to the total mass of a solid content in the cellulose fiber-containing resin composition. On the other hand, the content of the resin is preferably 99.9% by mass or less, more preferably 99.0% by mass or less, and further preferably 98.0% by mass or less, with respect to the total mass of a solid content in the cellulose fiber-containing resin composition.

(Organic Solvent)

The cellulose fiber-containing resin composition of the present invention may further comprise an organic solvent. The cellulose fiber-containing resin composition further comprising an organic solvent may also be referred to as a "resin-containing ultrafine cellulose fiber-dispersed solution."

The organic solvent is not particularly limited, and examples of the organic solvent may include methanol, ethanol, n-propyl alcohol, isopropyl alcohol (IPA), 1-butanol, m-cresol, glycerin, acetic acid, pyridine, tetrahydrofuran (THF), acetone, methyl ethyl ketone (MEK), ethyl acetate, aniline. N-methyl-2-pyrrolidone (NMP), dimethyl sulfoxide (DMSO), N,N-dimethylformamide (DMF), hexane, cyclohexane, benzene, toluene, p-xylene, diethyl ether, and chloroform. Among these, N-methyl-2-pyrrolidone (NMP), dimethyl sulfoxide (DMSO), methyl ethyl ketone (MEK), and toluene are preferably used.

The $\delta p$ of the Hansen solubility parameter (HSP) of the organic solvent is preferably 5 MPa$^{1/2}$ or more and 20 MPa$^{1/2}$ or less, more preferably 10 MPa$^{1/2}$ or more and 19 MPa$^{1/2}$ or less, and further preferably 12 MPa$^{1/2}$ or more and 18 MPa$^{1/2}$ or less. In addition, the $\delta h$ is preferably 5 MPa$^{1/2}$ or more and 40 MPa$^{1/2}$ or less, more preferably 5 MPa$^{1/2}$ or more and 30 MPa$^{1/2}$ or less, and further preferably 5 MPa$^{1/2}$ or more and 20 MPa$^{1/2}$ or less. The organic solvent, which simultaneously satisfies the $\delta p$ that is in the range of 0 MPa$^{1/2}$ or more and 4 MPa$^{1/2}$ or less and the $\delta h$ that is the range of 0 MPa$^{1/2}$ or more and 6 MPa$^{1/2}$ or less, is also preferable.

When the cellulose fiber-containing resin composition comprises an organic solvent, the content of the organic solvent is preferably 50% by mass or more, more preferably 60% by mass or more, and further preferably 70% by mass or more, with respect to the total mass of the cellulose fiber-containing resin composition. On the other hand, the content of the organic solvent is preferably 99% by mass or less, with respect to the total mass of the cellulose fiber-containing resin composition.

The solid concentration of the cellulose fiber-containing resin composition is preferably 1% by mass or more, more preferably 10% by mass or more, further preferably 30% by mass or more, still further preferably 40% by mass or more, and particularly preferably 50% by mass or more. On the other hand, the solid concentration of the cellulose fiber-containing resin composition is preferably 99% by mass or less.

(Optional Component)

In addition to the aforementioned ultrafine cellulose fibers and resin, the cellulose fiber-containing resin composition may also comprise one type or two or more types selected from surfactants, organic ions, coupling agents, inorganic layered compounds, inorganic compounds, leveling agents, antiseptics, antifoaming agents, organic particles, lubricants, antistatic agents, ultraviolet protectors, dyes, pigments, stabilizers, magnetic powders, orientation promoters, plasticizers, dispersing agents, and crosslinkers.

The content of such an optional component in the cellulose fiber-containing resin composition is preferably 40% by mass or less, more preferably 30% by mass or less, and further preferably 20% by mass or less, with respect to the total mass of a solid content in the cellulose fiber-containing resin composition.

(Moisture Content in Cellulose Fiber-Containing Resin Composition)

The water content in the cellulose fiber-containing resin composition of the present invention is preferably low. The water content in the cellulose fiber-containing resin composition is preferably 5% by mass or less, and more preferably 1% by mass or less, with respect to the total mass of the cellulose fiber-containing resin composition. Also, the water content in the cellulose fiber-containing resin composition is preferably 0% by mass.

(Step of Producing Cellulose Fiber-Containing Resin Composition)

The step of producing a cellulose fiber-containing resin composition preferably comprises a step of mixing a re-dispersed solution of the ultrafine cellulose fiber aggregate (condensate) obtained in the aforementioned <aggregation step > with a resin solution. Specifically, the step of producing a cellulose fiber-containing resin composition preferably comprises: a step of adding an aqueous solution containing organic onium ions, in which the pKb value of conjugate bases is 1.0 or more, to an ultrafine cellulose fiber-dispersed solution having phosphoric acid groups, so as to obtain an ultrafine cellulose fiber aggregate (condensate); a step of adding a solvent to the ultrafine cellulose fiber aggregate (condensate) to obtain a re-dispersed solution of ultrafine cellulose fibers; and a step of mixing the re-dispersed solution with a resin solution. Herein, the re-dispersed solution of the ultrafine cellulose fiber aggregate (condensate) is preferably obtained by mixing the ultrafine cellulose fiber aggregate (condensate) with a solvent. The type of such a solvent is not particularly limited, and examples of the solvent may include water, an organic solvent, and a mixture of water and an organic solvent. Among others, the solvent is preferably an organic solvent, and examples of the organic solvent may include the aforementioned organic solvents.

The content of the ultrafine cellulose fibers in the re-dispersed solution is preferably 0.1% by mass or more, and more preferably 0.5% by mass or more, with respect to the total mass of the re-dispersed solution. On the other hand, the content of the ultrafine cellulose fibers is preferably 20% by mass or less, and more preferably 15% by mass or less, with respect to the total mass of the re-dispersed solution.

The resin solution preferably comprises a resin and a solvent. In this case, the solvent is preferably of the same type as the solvent contained in the re-dispersed solution of the ultrafine cellulose fiber aggregate (condensate). The resin concentration in the resin solution is preferably 0.1% by mass or more, and more preferably 0.5% by mass or more, with respect to the total mass of the resin solution. On the other hand, the resin concentration in the resin solution is preferably 50% by mass or less, and more preferably 40% by mass or less, with respect to the total mass of the resin solution.

(Sheet)

The present invention may also relate to a sheet formed from the aforementioned cellulose fiber-containing resin composition. In the present embodiment, a sheet can be obtained by carrying out the after-mentioned step of producing a sheet, using, for example, the aforementioned cellulose fiber-containing resin composition. Specifically, the sheet of the present invention comprises cellulose fibers with a fiber width of 1000 nm or less having phosphoric acid groups or phosphoric acid group-derived substituents, and a resin. The couterions of the phosphoric acid groups or phosphoric acid group-derived substituents comprised in the cellulose fibers are organic onium ions, and the pKb of the conjugate bases of the organic onium ions is 1.0 or more.

The content of ultrafine cellulose fibers in the sheet is, for example, preferably 0.5% by mass or more, more preferably 1% by mass or more, further preferably 3% by mass or more, and particularly preferably 5% by mass or more, with respect to the total mass of the sheet. On the other hand, the content of ultrafine cellulose fibers in the sheet is preferably 99% by mass or less, more preferably 90% by mass or less, and further preferably 80% by mass or more, with respect to the total mass of the sheet.

Moreover, the sheet may comprise a solvent. As such a solvent, for example, the aforementioned solvent can be used. The content of the solvent in the sheet is, for example, preferably 0.5% by mass or more, more preferably 1% by mass or more, and further preferably 5% by mass or more, with respect to the total mass of the sheet. Thereby, softness can be imparted to the sheet. On the other hand, the content of the solvent in the sheet is, for example, preferably 25% by mass or less, and more preferably 15% by mass or less, with respect to the total mass of the sheet. Thereby, a sheet having favorable flexibility can be obtained.

The total light transmittance of the sheet is, for example, preferably 70% or more, more preferably 80% or more, and further preferably 85% or more. On the other hand, the upper limit value of the total light transmittance of the sheet is not particularly limited, and it may also be, for example, 100%. Herein, the total light transmittance of the sheet is a value measured in accordance with JIS K 7361, using, for example, a hazemeter (manufactured by MURAKAMI COLOR RESEARCH LABORATORY Co., Ltd.; HM-150).

The haze of the sheet is, for example, preferably 10% or less, more preferably 5% or less, and further preferably 2% or less. On the other hand, the lower limit value of the haze of the sheet is not particularly limited, and it may also be, for example, 0%. Herein, the haze of the sheet is a value measured in accordance with JIS K 7136, using, for example, a hazemeter (manufactured by MURAKAMI COLOR RESEARCH LABORATORY Co., Ltd.; HM-150).

The yellowness (YI) of the sheet is preferably 40 or less, more preferably 20 or less, and further preferably 10 or less. The lower limit value of the yellowness (YI) is not particularly limited, and for example, it is preferably set to be 0.1. Besides, the yellowness (YI) of the sheet is a value measured in accordance with JIS K 7373, using, for example, Colour Cute i (manufactured by Suga Test Instruments Co., Ltd.).

Regarding the sheet, in the case of measuring infrared absorption spectrum, the value calculated according to the aforementioned equation (J value) is preferably 0.80 or more, more preferably 0.85 or more, further preferably 0.90 or more, still further preferably 0.95 or more, and particularly preferably 0.99 or more.

The thickness of the sheet is not particularly limited, and for example, it is preferably 5 µm or more, more preferably 10 µm or more, and further preferably 20 µm or more. In addition, the upper limit value of the thickness of the sheet is not particularly limited, and for example, it can beset to be 1000 µm. The thickness of the sheet can be measured using, for example, a stylus thickness gauge (manufactured by Mahr; Millitron 1202 D).

The basis weight of the sheet is not particularly limited, and for example, it is preferably 10 g/m$^2$ or more, more preferably 20 g/m$^2$ or more, and further preferably 30 g/m$^2$ or more. On the other hand, the basis weight of the sheet is not particularly limited, and for example, it is preferably 200 g/m or less, and more preferably 150 g/m$^2$ or less. Herein, the basis weight of the sheet can be calculated, for example, in accordance with JIS P 8124.

<Step of Producing Sheet>

The step of producing a sheet comprises a coating step of applying the aforementioned cellulose fiber-containing resin composition (slurry) onto a base material, or a papermaking step of making paper from the aforementioned cellulose fiber-containing resin composition (slurry). Thereby, a sheet comprising ultrafine cellulose fibers can be obtained.

<Coating Step>

In the coating step, for example, a cellulose fiber-containing resin composition (slurry) is applied onto a base material, and is then dried to form a sheet, which is then detached from the base material, so as to obtain a sheet. In addition, using a coating apparatus and a long base material, the sheets can be continuously produced.

The material of the base material used in the coating step is not particularly limited. Although a base material having higher wettability to the composition (slurry) is preferable because shrinkage of the sheet or the like upon drying is suppressed, it is preferable to select one from which a sheet formed after drying can be easily detached. Of these, a resin film or plate, or a metal film or plate is preferable, but is not particularly limited thereto. Examples of the base material that can be used herein include: resin films or plates, such as those made of acrylic acid, polyethylene terephthalate, vinyl chloride, polystyrene, or polyvinylidene chloride; metal films or plates, such as those made of aluminum, zinc, copper, or iron; these films or plates obtained by the oxidation treatment of surface thereof; and stainless steel films or plates and brass films or plates.

When the slurry has a low viscosity and spreads on the base material in the coating step, a damming frame may be fixed and used on the base material in order to obtain a sheet having a predetermined thickness and basis weight. The damming frame is not particularly limited, and for example, it is preferable to select ones from which the edges of the sheet adhering thereto after drying can be easily detached. From such a viewpoint, frames formed from resin plates or metal plates are more preferable. In the present embodiment, examples of the frames that can be used herein may include frames formed from resin plates, such as an acryl plate, a polyethylene terephthalate plate, a vinyl chloride plate, a polystyrene plate, or a polyvinylidene chloride plate; frames formed from metal plates such as an aluminum plate, a zinc plate, a copper plate, or an iron plate; frames formed from these plates, surfaces of which have been subjected to an oxidation treatment; and frames molded from stainless steel plates, brass plates, etc.

A coater for applying the slurry onto the base material is not particularly limited, and examples of such a coater that can be used herein may include roll coaters, gravure coaters, die coaters, curtain coaters, and air doctor coaters. Among these, die coaters, curtain coaters, and spray coaters are particularly preferable because these coaters can provide more even thickness to the sheet.

The slurry temperature and the ambient temperature applied upon application of the slurry onto the base material are not particularly limited, and for example, the temperatures are preferably 5° C. or higher and 80° C. or lower, more preferably 10° C. or higher and 60° C. or lower, further preferably 15° C. or higher and 50° C. or lower, and particularly preferably 20° C. or higher and 40° C. or lower. When the coating temperature is equal to or higher than the above-described lower limit value, it is possible to easily apply the slurry onto the base material. When the coating temperature is equal to or lower than the above-described upper limit value, it is possible to suppress volatilization of the dispersion medium during the coating.

In the coating step, it is preferable to apply the slurry onto the base material, so that the finished basis weight of the sheet becomes preferably 10 g/m$^2$ or more and 200 g/m$^2$ or less, and more preferably 20 g/m$^2$ or more and 150 g/m$^2$ or less. By applying the slurry so that the basis weight can be within the above-described range, a sheet having excellent strength can be obtained.

As described above, the coating step comprises a step of drying the slurry applied onto the base material. The step of drying the slurry is not particularly limited, and for example, a contactless drying method or a method of drying the sheet while locking the sheet, or a combination of these methods may be applied. The contactless drying method is not particularly limited, and for example, a method for drying by heating with hot air, infrared radiation, far-infrared radiation, or near-infrared radiation (a drying method by heating) or a method for drying in vacuum (a vacuum drying method) can be applied. Although the drying method by heating and the vacuum drying method may be combined with each other, the drying method by heating is usually applied. The drying with infrared radiation, far-infrared radiation, or near-infrared radiation is not particularly limited, and for example, it can be performed using an infrared apparatus, a far-infrared apparatus, or a near-infrared apparatus. The heating temperature applied in the drying method by heating is not particularly limited, and it is preferably 20° C. or higher and 150° C. or lower, and more preferably 25° C. or higher and 105° C. or lower. If the heating temperature is set to be equal to or higher than the above-described lower limit value, the dispersion medium can be rapidly volatilized. On the other hand, if the heating temperature is set to be equal to or lower than the above-described upper limit value, reduction in costs required for the heating and suppression of the thermal discoloration of the cellulose fibers can be realized.

<Papermaking Step>

The papermaking step is carried out by making a paper from a slurry using a paper machine. The paper machine used in the papermaking step is not particularly limited, and examples thereof may include continuous paper machines such as a Fourdrinier paper machine, a cylinder paper machine, and an inclined paper machine, and a multilayer combination paper machine, which is a combination thereof.

A known papermaking method, such as papermaking by hand, may be adopted in the papermaking step.

The papermaking step is carried out by subjecting the slurry to wire-filtration and dehydration to obtain a sheet that is in a wet state, and then pressing and drying this sheet. The filter fabric used in the filtration and dehydration of the slurry is not particularly limited, and for example, a filter fabric, through which cellulose fibers do not pass and the filtration speed is not excessively slow is more preferable. Such filter fabric is not particularly limited, and for example, a sheet, a woven fabric, or a porous membrane, each consisting of an organic polymer, is preferable. Preferred examples of the organic polymer may include, but are not particularly limited to, non-cellulose organic polymers such as polyethylene terephthalate, polyethylene, polypropylene, and polytetrafluoroethylene (PTFE). In the present embodiment, examples of the filter fabric may include a polytetrafluoroethylene porous membrane having a pore size of 0.1 μm or more and 20 μm or less, and a woven fabric made of polyethylene terephthalate or polyethylene having a pore size of 0.1 μm or more and 20 μm or less.

In the sheet formation step, the method for producing a sheet from a slurry can be carried out, for example, using a production apparatus comprising a dewatering section for ejecting a cellulose fiber-containing composition (slurry) onto the upper surface of an endless belt and then dewatering a dispersion medium contained in the ejected slurry to form a web, and a drying section for drying the web to produce a sheet. The endless belt is provided across from the dewatering section to the drying section, and the web formed in the dewatering section is transferred to the drying section while being placed on the endless belt.

The dehydration method used in the papermaking step is not particularly limited, and for example, a dehydration method conventionally used for paper production may be applied. Among others, a method comprising performing dehydration using a Fourdrinier, cylinder, tilted wire, or the like and then performing dehydration using a roll press is preferable. In addition, the drying method used in the papermaking step is not particularly limited, and for example, a drying method used for paper production may be applied. Among others, a drying method using a cylinder dryer, a Yankee dryer, hot air drying, a near-infrared heater, or an infrared heater is more preferable.

(Molded Body)

The present invention relates to a molded body formed from the aforementioned cellulose fiber-containing resin composition or the aforementioned sheet. In the present invention, since ultrafine cellulose fibers excellent in terms of compatibility with a resin are used, the molded body has excellent bending elastic modulus, and further has strength and dimensional stability. In addition, the molded body of the present invention is also excellent in terms of transparency.

<Step of Producing Molded Body>

The method of molding a molded body is not particularly limited, and an injection molding method, a heat and pressure molding method, etc. can be adopted. Moreover, when a sheet is molded from the molded body, the sheet may be molded by a press molding method or a vacuum molding method.

(Intended Use)

The intended use of the cellulose fiber-containing resin composition of the present invention is not particularly limited. The present cellulose fiber-containing resin composition can be used, for example, as a thickener, a reinforcing material, or an additive, in cosmetic products, cements, paints, inks and the like. Moreover, the cellulose fiber-containing resin composition is molded, so that it can also be used as a reinforcing material. Furthermore, films are produced using a re-dispersed slurry of the cellulose fiber-containing resin composition, and can be used as various types of sheets.

The sheet of the present invention is suitable for intended uses such as light transmissive substrates for various display devices, various solar cells, and the like. In addition, the sheet of the present invention is also suitable for intended uses, such as substrates of electronic devices, separators for electrochemical devices, components of consumer electronics, window materials of various types of vehicles or buildings, interior materials, exterior materials, and wrapping materials. Moreover, the cellulose-containing film of the present invention is also suitable for intended uses, such as threads, filters, woven fabrics, buffering materials, sponges, and polishing materials, and also, other intended uses, in which the sheet itself is used as a reinforcing material.

EXAMPLES

The present invention will be more specifically described in the following examples. However, the following examples are not intended to limit the scope of the present invention.

Production Example 1

[Production of Ultrafine Cellulose Fiber Concentrate]

The needle bleached kraft pulp manufactured by Oji Paper Co., Ltd. (solid content: 93% by mass; basis weight: 208 g/m$^2$, sheet-shaped; and Canadian Standard Freeness (CSF) measured according to JIS P 8121 after defibration is 700 ml) was used as a raw material pulp.

A phosphorylation treatment was performed on this raw material pulp as follows. First, a mixed aqueous solution of ammonium dihydrogen phosphate and urea was added to 100 parts by mass (absolute dry mass) of the above raw material pulp, and the obtained mixture was adjusted to result in 45 parts by mass of the ammonium dihydrogen phosphate, 120 parts by mass of the urea and 150 parts by mass of water, so as to obtain a chemical-impregnated pulp. Subsequently, the obtained chemical-impregnated pulp was heated in a hot-air dryer at 165° C. for 200 seconds, so that phosphoric acid groups were introduced into cellulose in the pulp, thereby obtaining a phosphorylated pulp.

Subsequently, a washing treatment was performed on the obtained phosphorylated pulp. The washing treatment was carried out by repeating the operation to pour 10 L of ion exchange water onto 100 g (absolute dry mass) of the phosphorylated pulp to obtain a pulp dispersed solution, which was then uniformly dispersed by stirring, followed by filtration and dehydration. The washing was terminated at a time point at which the electric conductivity of the filtrate became 100 μS/cm or less.

The above-described phosphorylation treatment and the above-described washing treatment were further carried out on the washed phosphorylated pulp each once in this order.

Subsequently, a neutralization treatment was performed on the phosphorylated pulp after the washing as follows. First, the phosphorylated pulp after the washing was diluted with 10 L of ion exchange water, and then, while stirring, a 1 N sodium hydroxide aqueous solution was slowly added to the diluted solution to obtain a phosphorylated pulp slurry having a pH value of 12 or more and 13 or less. Thereafter, the phosphorylated pulp slurry was dehydrated, so as to obtain a neutralized phosphorylated pulp. Subsequently, the above-described washing treatment was performed on the phosphorylated pulp after the neutralization treatment.

The infrared absorption spectrum of the thus obtained phosphorylated pulp was measured by FT-IR. As a result, absorption based on the phosphoric acid groups was observed around 1230 cm$^{-1}$, and thus, addition of the phosphoric acid groups to the pulp was confirmed.

Moreover, the obtained phosphorylated pulp was analyzed using an X-ray diffractometer. As a result, it was confirmed that there were typical peaks at two positions near 2θ=14° or more and 17° or less, and near 2θ=22° or more and 23° or less. Thus, the phosphorylated pulp was confirmed to have cellulose type I crystals.

Ion exchange water was added to the obtained phosphorylated pulp, so as to prepare a slurry having a solid concentration of 2% by mass. This slurry was treated using a wet atomization apparatus (manufactured by Sugino Machine Limited, Star Burst) at a pressure of 200 MPa six times to obtain an ultrafine cellulose fiber-dispersed solution A comprising ultrafine cellulose fibers.

It was confirmed according to X-ray diffraction that these ultrafine cellulose fibers maintained cellulose type I crystals. Moreover, the fiber width of the ultrafine cellulose fibers was measured using a transmission electron microscope. As a result, the fiber width was 3 to 5 nm. Besides, the amount of phosphoric acid groups (the amount of strong acid groups) measured by the after-mentioned measurement method was 2.00 mmol/g.

6.60 mL of 1 N hydrochloric acid was added to 100 g of an aqueous solution containing 1.83% by mass of polyoxyethylene dodecylamine (the number of oxyethylene residues: 2) for neutralization, so as to obtain a polyoxyethylene dodecylamine aqueous solution, and thereafter, the obtained polyoxyethylene dodecylamine aqueous solution was added to 100 g of the ultrafine cellulose fiber-dispersed solution A, followed by performing a stirring treatment for 5 minutes using a disperser. As a result, an aggregate was generated in the ultrafine cellulose fiber-dispersed solution. The ultrafine cellulose fiber-dispersed solution comprising such an aggregate was filtrated under reduced pressure to obtain an ultrafine cellulose fiber aggregate. The obtained ultrafine cellulose fiber aggregate was repeatedly washed with ion exchange water to remove redundant polyoxyethylene dodecylamine and hydrochloric acid contained in the ultrafine cellulose fiber aggregate, eluted ions, and the like, so as to obtain an ultrafine cellulose fiber concentrate A. The counterions of phosphoric acid groups comprised in the ultrafine cellulose fiber concentrate A were polyoxyethylene dodecyl ammonium ions (POEDA$^+$). Moreover, from the results of nitrogen analysis, it was found that, with regard to the ratio between P atoms and N atoms in the ultrafine cellulose fiber concentrate A, N/P>1.2. The solid concentration of the obtained ultrafine cellulose fiber concentrate A was 89% by mass. The pKb of polyoxyethylene dodecylamine that was the conjugate base of POEDA$^+$ was 7.9.

Production Example 2

An ultrafine cellulose fiber concentrate B was obtained in the same manner as that of Production Example 1, with the exception that 100 g of an aqueous solution containing 3.86% by mass of di-n-stearyldimethyl ammonium chloride was used instead of the polyoxyethylene dodecylamine aqueous solution. The counterions of phosphoric acid groups comprised in the ultrafine cellulose fiber concentrate B were di-n-stearyldimethyl ammonium ions (DADMA$^+$). Moreover, from the results of nitrogen analysis, it was found that, with regard to the ratio between P atoms and N atoms in the ultrafine cellulose fiber concentrate B. N/P>1.2. The solid concentration of the obtained ultrafine cellulose fiber concentrate B was 90% by mass. The pKb of di-n-stearyldimethyl ammonium hydroxide that was the conjugate base of DADMA$^+$ was 2.9.

Production Example 3

An ultrafine cellulose fiber concentrate C was obtained in the same manner as that of Production Example 1, with the exception that 100 g of an aqueous solution containing 2.43% by mass of N,N-didodecylmethylamine was used instead of the polyoxyethylene dodecylamine aqueous solution. The counterions of phosphoric acid groups comprised in the ultrafine cellulose fiber concentrate C were N,N-didodecylmethyl ammonium ions (DDMA$^+$). Moreover, from the results of nitrogen analysis, it was found that, with regard to the ratio between P atoms and N atoms in the ultrafine cellulose fiber concentrate C, N/P>1.2. The solid concentration of the obtained ultrafine cellulose fiber concentrate C was 89% by mass. The pKb of N,N-didodecylmethylamine that was the conjugate base of DDMA$^+$ was 3 or more.

Production Example 4

An ultrafine cellulose fiber-dispersed solution A was obtained in the same manner as that of Production Example 1. 100 g of the ultrafine cellulose fiber-dispersed solution A was taken, and while stirring, it was added to 0.39 g of aluminum sulfate. The obtained mixture was further stirred for 5 hours, and as a result, an aggregate of ultrafine cellulose fibers was observed. Subsequently, the ultrafine cellulose fiber-dispersed solution was filtrated, and was then compressed using a filter, so as to obtain an ultrafine cellulose fiber aggregate. The obtained ultrafine cellulose fiber aggregate was re-suspended in ion exchange water, so that the content of the ultrafine cellulose fibers became 2.0% by mass. Thereafter, the operation of performing filtration and compression was repeated for washing, so as to obtain an ultrafine cellulose fiber concentrate D. The washing was terminated at a time point at which the electric conductivity of the filtrate became 100 μS/cm or less. The solid concentration of the obtained ultrafine cellulose fiber concentrate D was 17% by mass.

Example 1

[Re-Dispersion of Ultrafine Cellulose Fiber Concentrate]

Dimethyl sulfoxide (DMSO) was added to the ultrafine cellulose fiber concentrate A, so that the content of the ultrafine cellulose fibers became 2.0% by mass. Thereafter, using an ultrasonic homogenizer (manufactured by Hielscher, UP400S), an ultrasonic treatment was carried out for 10 minutes to obtain a re-dispersed slurry of the ultrafine cellulose fibers.

[Dissolution of Resin]

Dimethyl sulfoxide was added to acrylic resin (1) (manufactured by Kusumoto Chemicals, Ltd., NeoCryl B-817), so that the concentration of the acrylic resin (1) became 2.0% by mass, followed by stirring, so as to obtain an acrylic resin solution.

[Preparation of Dispersed Solution]

The acrylic resin solution was added to the obtained re-dispersed slurry of ultrafine cellulose fibers, so that the amount of the acrylic resin became 90 parts by mass with respect to 10 parts by mass of the ultrafine cellulose fibers, thereby obtaining a resin-containing ultrafine cellulose fiber-dispersed solution in which the solid concentration was 2.0% by mass.

[Sheet Formation]

The resin-containing ultrafine cellulose fiber-dispersed solution was weighed, so that the finished basis weight of a sheet became 100 g/m², and it was then poured onto a glass petri dish. It was then dried in a hot-air dryer at 100° C. for 24 hours to obtain a sheet. The J value of the obtained sheet was calculated according to the after-mentioned method.

Example 2

A sheet was obtained in the same manner as that of Example 1, with the exceptions that another type of acrylic resin (2) (manufactured by DIC Corporation, Acrydic A-181) was used instead of the acrylic resin (1) (manufactured by Kusumoto Chemicals, Ltd., NeoCryl B-817), that the ultrafine cellulose fiber concentrate B was used instead of the ultrafine cellulose fiber concentrate A, that toluene was used instead of dimethyl sulfoxide, and that the temperature of the hot-air dryer was set at 40° C. instead of 100° C. The J value of the obtained sheet was calculated according to the after-mentioned method.

Example 3

A sheet was obtained in the same manner as that of Example 1, with the exceptions that polyvinyl alcohol (manufactured by KURARAY CO., LTD., POVAL 117) was used instead of the acrylic resin, and that the ultrafine cellulose fiber concentrate C was used instead of the ultrafine cellulose fiber concentrate A. The J value of the obtained sheet was calculated according to the after-mentioned method.

Example 4

A sheet was obtained in the same manner as that of Example 3, with the exceptions that polyvinylidene fluoride (manufactured by Solvay, Solef 6020) was used instead of polyvinyl alcohol, that N-methyl-2-pyrrolidone (NMP) was used instead of dimethyl sulfoxide, and that the temperature of the hot-air dryer was set at 80° C. instead of 100° C. The total light transmittance and yellowness (YI) of the obtained sheet were measured according to the after-mentioned methods.

Example 5

A sheet was obtained in the same manner as that of Example 4, with the exception that polyvinyl chloride (manufactured by Wako Pure Chemical Industries, Ltd.) was used instead of polyvinylidene fluoride. The total light transmittance and yellowness (YI) of the obtained sheet were measured according to the after-mentioned methods.

Comparative Example 1

To 11.2 g of the ultrafine cellulose fiber concentrate D, 3.96 g of an aqueous solution containing 55% tetrabutyl ammonium hydroxide was added, and methyl ethyl ketone was then added thereto, so that the content of the ultrafine cellulose fibers became 1.0% by mass. Subsequently, using an ultrasonic homogenizer (manufactured by Hielscher, UP400S), an ultrasonic treatment was carried out for 10 minutes to obtain a re-dispersed slurry of ultrafine cellulose fibers. Thereby, phosphoric acid groups were crosslinked by aluminum ions, so that the aggregated counterions were converted to tetrabutyl ammonium ions (TBA⁺) and were then dispersed.

Methyl ethyl ketone (MEK) was added to the acrylic resin (1) (manufactured by Kusumoto Chemicals. Ltd., NeoCryl B-817) followed by stirring, so that the concentration of the acrylic resin (1) became 2.0% by mass, thereby obtaining an acrylic resin solution. The pKb of the tetrabutyl ammonium hydroxide was 0.5.

The acrylic resin solution was added to the obtained re-dispersed slurry of ultrafine cellulose fibers, so that the amount of the acrylic resin became 90 parts by mass with respect to 10 parts by mass of the ultrafine cellulose fibers, and methyl ethyl ketone was further added thereto, so that the solid concentration became 1.0% by mass, thereby obtaining a resin-containing ultrafine cellulose fiber-dispersed solution.

The resin-containing ultrafine cellulose fiber-dispersed solution was weighed, so that the finished basis weight of a sheet became 100 g/m², and it was then poured onto a glass petri dish. It was then dried in a hot-air dryer at 60° C. for 24 hours to obtain a sheet. The J value of the obtained sheet was calculated according to the after-mentioned method.

Comparative Example 2

A sheet was obtained in the same manner as that of Comparative Example 1, with the exceptions that another type of acrylic resin (2) (manufactured by DIC Corporation, Acrydic A-181) was used instead of the acrylic resin (1) (manufactured by Kusumoto Chemicals, Ltd., NeoCryl B-817), that toluene was used instead of methyl ethyl ketone, and that the temperature of the hot-air dryer was set at 40° C. instead of 60° C. The J value of the obtained sheet was calculated according to the after-mentioned method.

Comparative Example 3

A sheet was obtained in the same manner as that of Comparative Example 1, with the exceptions that polyvinyl alcohol was used instead of the acrylic resin, that dimethyl sulfoxide was used instead of methyl ethyl ketone, and that the temperature of the hot-air dryer was set at 100° C. instead of 60° C. The J value of the obtained sheet was calculated according to the after-mentioned method.

Comparative Example 4

A sheet was obtained in the same manner as that of Comparative Example 3, with the exceptions that polyvinylidene fluoride was used instead of polyvinyl alcohol, that N-methyl-2-pyrrolidone was used instead of dimethyl sulfoxide, and that the temperature of the hot-air dryer was set at 80° C. instead of 100° C. The total light transmittance and yellowness (YI) of the obtained sheet were measured according to the after-mentioned methods.

Comparative Example 5

A sheet was obtained in the same manner as that of Comparative Example 4, with the exception that polyvinyl chloride was used instead of polyvinylidene fluoride. The total light transmittance and yellowness (YI) of the obtained sheet were measured according to the after-mentioned methods.

<Evaluation>
[Measurement of Amount of Phosphoric Acid Groups]

The amount of phosphoric acid groups in the ultrafine cellulose fibers was measured by treating with an ion exchange resin, a cellulose fiber-containing slurry prepared by diluting the ultrafine cellulose fiber-dispersed solution comprising ultrafine cellulose fibers as targets with ion exchange water to result in a content of 0.2% by mass, and then performing titration using alkali.

In the treatment with the ion exchange resin, 1/10 by volume of a strongly acidic ion exchange resin (Amberjet 1024; manufactured by Organo Corporation; conditioned) was added to the aforementioned cellulose fiber-containing slurry, and the resultant mixture was shaken for 1 hour. Then, the mixture was poured onto a mesh having 90-μm apertures to separate the resin from the slurry.

In the titration using alkali, a change in the electric conductivity value indicated by the slurry was measured while adding an aqueous solution of 0.1 N sodium hydroxide, once 30 seconds, in each amount of 50 s, to the cellulose fiber-containing slurry after completion of the treatment with the ion exchange resin. Specifically, among the calculation results, the alkali amount (mmol) required in a region corresponding to the first region shown in FIG. 1 was divided by the solid content (g) in the slurry to be titrated, so as to obtain the amount of phosphoric acid groups (mmol/g).

[Measurement of Total Light Transmittance of Sheet]

The total light transmittance of the obtained sheet was measured in accordance with JIS K 7361, using a hazemeter (manufactured by MURAKAMI COLOR RESEARCH LABORATORY Co., Ltd.; HM-150).

[Measurement of Yellowness (YI) of Sheet]

The yellowness of the obtained sheet was measured in accordance with JIS K 7373, using Colour Cute i (manufactured by Suga Test Instruments Co., Ltd.).

[Calculation of J Value of Sheet]

The sheet obtained in each of the Examples and Comparative Examples was set to be a sheet (A), and a sheet having the same basis weight of the sheet (A) that was formed from only the resin comprised in the cellulose fiber-containing resin composition was set to be a sheet (B). The infrared absorption spectrum of each sheet was measured using FT-IR, and the J value was then calculated according to the following equation:

$$J \text{ value} = I_1/I_0, \text{ wherein}$$

$I_1$ value=(absorption peak intensity of sheet (A) at 1650 $cm^{-1}$)/(absorption peak intensity of sheet (A) at 1570 $cm^{-1}$), and $I_0$ value=(absorption peak intensity of sheet (B) at 1650 $cm^{-1}$)/(absorption peak intensity of sheet (B) at 1570 $cm^{-1}$).

[Calculation of pKb of Conjugate Bases of Organic Onium Ions]

The conjugate bases of organic onium ions were prepared, separately, and water was then added to the conjugate bases of organic onium ions to prepare an aqueous solution containing the conjugate bases of 0.01 N organic onium ions. The pH of the aqueous solution at 25° C. was measured, and the pKb of the conjugate bases of the organic onium ions was then calculated according the following equations (1) and (2):

$$[OH] = 10^{-(14-pH)}, \text{ and} \quad (1)$$

$$pKb = -\log_{10}([OH]^2/(0.01-[OH])). \quad (2)$$

In the above equations, [OH] indicates the concentration of hydroxide ions (mol/L) in the aqueous solution of the conjugate bases of organic onium.

The conjugate bases of organic onium that is hardly soluble in water are hardly ionized in water, and thus, they hardly release hydroxide ions. Hence, the pKb is assumed to be extremely large, and thus, in the present description, the pKb of the conjugate bases of the hardly-soluble organic onium was considered to be greater than 3.0.

Organic onium ions and conjugate bases corresponding thereto are shown below.

TABLE 1

| Organic onium | Conjugate base |
|---|---|
| Polyoxyethylene dodecyl ammonium | Polyoxyethylene dodecylamine |
| Di-n-stearyl dimethyl ammonium | Di-n-stearyl dimethyl ammonium hydroxide |
| N,N-didodecyl methyl ammonium | N,N-didodecylmethylamine |
| Tetrabutyl ammonium | Tetrabutyl ammonium hydroxide |

TABLE 2

| | Resin used in composite | Type of organic onium ion | pKb of conjugate bases of organic onium | Content (mass %) of ultrafine cellulose fibers in composition | Solvent | J value |
|---|---|---|---|---|---|---|
| Ex. 1 | Acrylic resin (1) | Polyoxyethylene dodecyl ammonium | 7.9 | 10 | DMSO | 0.93 |
| Comp. Ex. 1 | | Tetrabutyl ammonium | 0.5 | 10 | MEK | 0.76 |

TABLE 3

| | | Ultrafine cellulose fibers | | | |
|---|---|---|---|---|---|
| | Resin used in composite | Type of organic onium ion | pKb of conjugate bases of organic onium | Content (mass %) of ultrafine cellulose fibers in composition | Solvent | J value |
| Ex. 2 | Acrylic resin (2) | Distearyl dimethyl ammonium | 2.9 | 10 | Toluene | 0.98 |
| Comp. Ex. 2 | | Tetrabutyl ammonium | 0.5 | 10 | Toluene | 0.69 |

TABLE 4

| | | Ultrafine cellulose fibers | | | |
|---|---|---|---|---|---|
| | Resin used in composite | Type of organic onium ion | pKb of conjugate bases of organic onium | Content (mass %) of ultrafine cellulose fibers in composition | Solvent | J value |
| Ex. 3 | PVA | N,N-didodecyl methyl ammonium | >3 | 10 | DMSO | 1.30 |
| Comp. Ex. 3 | | Tetrabutyl ammonium | 0.5 | 10 | DMSO | 0.52 |

TABLE 5

| | | Ultrafine cellulose fibers | | | | |
|---|---|---|---|---|---|---|
| | Resin used in composite | Type of organic onium ion | pKb of conjugate bases of organic onium | Content (mass %) of ultrafine cellulose fibers in composition | Solvent | Total light transmittance (%) | YI |
| Ex. 4 | PVDF | N,N-didodecyl methyl ammonium | >3 | 10 | NMP | 73.4 | 1.6 |
| Ex. 5 | PVC | N,N-didodecyl methyl ammonium | >3 | 10 | NMP | 90.3 | 1.4 |
| Comp. Ex. 4 | PVDF | Tetrabutyl ammonium | 0.5 | 10 | NMP | 18.1 | 96.6 |
| Comp. Ex. 5 | PVC | Tetrabutyl ammonium | 0.5 | 10 | NMP | 0 | >100 |

It was found that, in the Examples, deterioration of the resin was suppressed.

It was found that, in Examples 1 to 3, the J value was high, and thereby deterioration of the resin was suppressed. In addition, it was found that, in Examples 4 and 5, the total light transmittance was high and the YI value was low, and thus that deterioration of the resin was suppressed.

Besides, even in an example in which cellulose fibers having, as counterions of phosphoric acid groups or phosphoric acid group-derived substituents, polyoxyethylene dodecyl ammonium ions (POEDA$^+$), di-n-alkylstearyldimethyl ammonium ions (DADMA$^+$) or N,N-didodecylmethyl ammonium ions (DDMA$^+$), were mixed with a polyurethane resin by the same method as that applied in the Examples, a high J value was obtained, and deterioration of the resin was suppressed.

The invention claimed is:

1. A cellulose fiber-containing resin composition comprising cellulose fibers with a fiber width of 1000 nm or less having phosphoric acid groups or phosphoric acid group-derived substituents, and a resin, wherein the counterions of the phosphoric acid groups or phosphoric acid group-derived substituents are organic onium ions, and the conjugate bases of the organic onium ions have a pKb value of 1.0 or more.

2. The cellulose fiber-containing resin composition according to claim 1, wherein the organic onium ions satisfy at least one condition selected from the following (a) and (b):

(a) containing a hydrocarbon group containing 5 or more carbon atoms; and (b) having a total carbon number of 17 or more.

3. The cellulose fiber-containing resin composition according to claim 1, wherein the organic onium ions are organic ammonium ions.

4. The cellulose fiber-containing resin composition according to claim 1, wherein the resin is at least one type selected from an acrylic resin, a polycarbonate resin, a polyester resin, a polyamide resin, a silicone resin, a fluorine resin, a chlorine resin, an epoxy resin, a melamine resin, a phenolic resin, a polyurethane resin, a diallyl phthalate resin, an alcoholic resin, a cellulose derivative, and precursors of these resins.

5. The cellulose fiber-containing resin composition according to claim 1, which further comprises an organic solvent.

6. A sheet formed from the cellulose fiber-containing resin composition according to claim 1.

7. A molded body formed from the cellulose fiber-containing resin composition according to claim 1.

8. A molded body formed from the sheet according to claim 6.

* * * * *